(12) United States Patent
Åhlander

(10) Patent No.: US 8,867,445 B2
(45) Date of Patent: Oct. 21, 2014

(54) BIT SOFT VALUE NORMALIZATION

(75) Inventor: Mats Åhlander, Täby (SE)

(73) Assignee: Optis Wireless Technology, LLC, Plano, TX (US)

( * ) Notice: Subject to any disclaimer, the term of this patent is extended or adjusted under 35 U.S.C. 154(b) by 212 days.

(21) Appl. No.: 13/512,357

(22) PCT Filed: Nov. 30, 2009

(86) PCT No.: PCT/SE2009/051353
§ 371 (c)(1),
(2), (4) Date: May 29, 2012

(87) PCT Pub. No.: WO2011/065878
PCT Pub. Date: Jun. 3, 2011

(65) Prior Publication Data
US 2012/0230220 A1  Sep. 13, 2012

(51) Int. Cl.
*H04W 4/00* (2009.01)
*H04L 25/06* (2006.01)
*H04L 25/03* (2006.01)
*H04L 5/00* (2006.01)

(52) U.S. Cl.
CPC ......... *H04L 25/067* (2013.01); *H04L 25/03318* (2013.01); *H04L 25/03006* (2013.01); *H04L 5/0007* (2013.01)
USPC ....................................................... 370/328

(58) Field of Classification Search
None
See application file for complete search history.

(56) References Cited

U.S. PATENT DOCUMENTS

| 6,980,602 B1 * | 12/2005 | Kleinerman et al. | 375/262 |
| 2002/0067777 A1 | 6/2002 | Jeong | |
| 2006/0029162 A1 | 2/2006 | Chi | |
| 2006/0078075 A1 * | 4/2006 | Stamoulis et al. | 375/346 |
| 2006/0268676 A1 * | 11/2006 | Gore et al. | 370/210 |
| 2007/0036245 A1 | 2/2007 | Hammerschmidt | |
| 2007/0211815 A1 * | 9/2007 | Pan et al. | 375/267 |
| 2007/0280387 A1 * | 12/2007 | Li et al. | 375/347 |
| 2008/0219341 A1 * | 9/2008 | Kim | 375/232 |
| 2008/0273630 A1 * | 11/2008 | Mege et al. | 375/341 |
| 2009/0046582 A1 * | 2/2009 | Sarkar et al. | 370/230.1 |
| 2011/0080877 A1 * | 4/2011 | Nentwig | 370/329 |
| 2011/0188466 A1 * | 8/2011 | Zhang et al. | 370/330 |
| 2012/0188994 A1 * | 7/2012 | Palanki et al. | 370/344 |
| 2013/0308657 A1 * | 11/2013 | Lee et al. | 370/480 |

FOREIGN PATENT DOCUMENTS

EP    2081298 A2    7/2009

* cited by examiner

*Primary Examiner* — Anh-Vu Ly
*Assistant Examiner* — Gustavo Lopez-Vargas
(74) *Attorney, Agent, or Firm* — Vincent J. Allen; James H. Ortega; Carstens & Cahoon, LLP

(57) ABSTRACT

An LTE uplink soft demapper includes an SC-FDMA symbol noise power meter (22) configured to individually determine a noise power measure for each SC-FDMA symbol in a slot by exploiting information contained in modulated data symbols of the corresponding SC-FDMA symbol. A bit soft value normalizer (24) connected to the SC-FDMA symbol noise power meter (22) is configured to normalize bit soft values, representing reliability of received bits obtained from the SC-FDMA symbols in the slot, based on the determined noise power measures.

15 Claims, 7 Drawing Sheets

BIT SOFT VALUE NORMALIZATION

TECHNICAL FIELD

The present invention relates generally to bit soft values in wireless systems, and especially to normalization of such bit soft values.

BACKGROUND

In a wireless system, such as in LTE (Long Term Evolution), a decoder is commonly used for correcting bit errors which have occurred during data transmission over the physical layer (also named L1 or the air interface). A common situation when bit errors may occur is when the received signal of interest is weaker than the surrounding noise and interference. The signal may, for example, be so weak that it is drowning in the thermal noise generated by different electrical components in the radio receiver, such as the resistors and transistors. Another common source of bit errors is when transmissions from neighboring LTE cells are leaking in and interfere with the signal of interest.

Different kinds of decoders exist, such as convolutional, turbo, block etc. Common to all these decoders is that their performance is improved if soft information is used at their input. The bit soft values input to the decoder are most commonly defined as the log-likelihood probability ratio of having received a bit as either zero or one. The sign of the bit soft value determines if the bit is a zero or a one and its magnitude determines the certainty of this decision. A bit soft value with a large magnitude is considered very reliable, while a bit soft value with a magnitude of zero is totally unreliable. Further details on bit soft value computation may be found in, for example, [1].

The received modulated data symbols (sometimes also referred to as modulation symbols) are often enhanced in an equalizer. The main purpose of the equalizer is to remove Inter-Symbol Interference (ISI) of the received signal. Inter-symbol interference is generated by delayed echoes of the original signal caused by the signal first being reflected on distant objects before reaching the receiver antenna.

After possible equalization a step called soft demapping is used. In this step each equalized symbol is converted into a sequence of log-likelihood ratios or bit soft values. The bit soft values are calculated by looking at the distances between the (possibly equalized) modulated data symbol and each point in the constellation diagram of the used modulation scheme.

An important part of the generation of the bit soft values is to normalize them properly. This normalization factor is inherent in the definition of the log-likelihood ratio. In the derivation of the log-likelihood ratios it turns out that the noise power in the received signal can be treated as a normalization factor. Hence, by using a good estimation of the noise power a good normalization of the bit soft values can be achieved.

In LTE the noise power can be estimated over the Reference Signal (RS). However, a problem with an RS based approach is that it only works well as long as the noise and interference is stationary over a complete slot. If the noise or interference level changes somewhere outside of the RS, the noise estimation corresponding to this time region will be incorrect and the bit soft values will get an incorrect normalization.

SUMMARY

An object of the present invention is to improve the normalization of LTE up-link bit soft values that are forwarded to a decoder.

This object is achieved in accordance with the attached claims.

An LTE uplink bit soft value normalization method in accordance with the present invention individually determines a noise power measure for each SC-FDMA symbol in a slot by exploiting information contained in modulated data symbols (sometimes also referred to as modulation symbols) of the corresponding SC-FDMA symbol. Normalization of bit soft values, representing reliability of received bits obtained from the SC-FDMA symbols in the slot, is then based on the determined noise power measures.

An LTE uplink soft demapper in accordance with the present invention includes an SC-FDMA symbol noise power meter configured to individually determine a noise power measure for each SC-FDMA symbol in a slot by exploiting information contained in modulated data symbols of the corresponding SC-FDMA symbol. A bit soft value normalizer connected to the SC-FDMA symbol noise power meter is configured to normalize bit soft values, representing reliability of received bits obtained from the SC-FDMA symbols in the slot, based on the determined noise power measures.

An LTE receiver in accordance with the present invention includes such a demapper.

The present invention will make the LTE receiver more robust against non-stationary noise and interference. The benefit of this is that less transmit power is needed in order to reach the same throughput compared to using a more conventional RS based method of bit soft value normalization. In short, substantially better spectrum efficiency will be achieved, especially for unsynchronized networks.

BRIEF DESCRIPTION OF THE DRAWINGS

The invention, together with further objects and advantages thereof, may best be understood by making reference to the following description taken together with the accompanying drawings, in which.

DETAILED DESCRIPTION

In the following text the term noise is intended to refer both to interference from other communication devices and to noise having other origins, such as thermal noise, noise from electronic components, atmospheric noise, etc.

Figure 1:
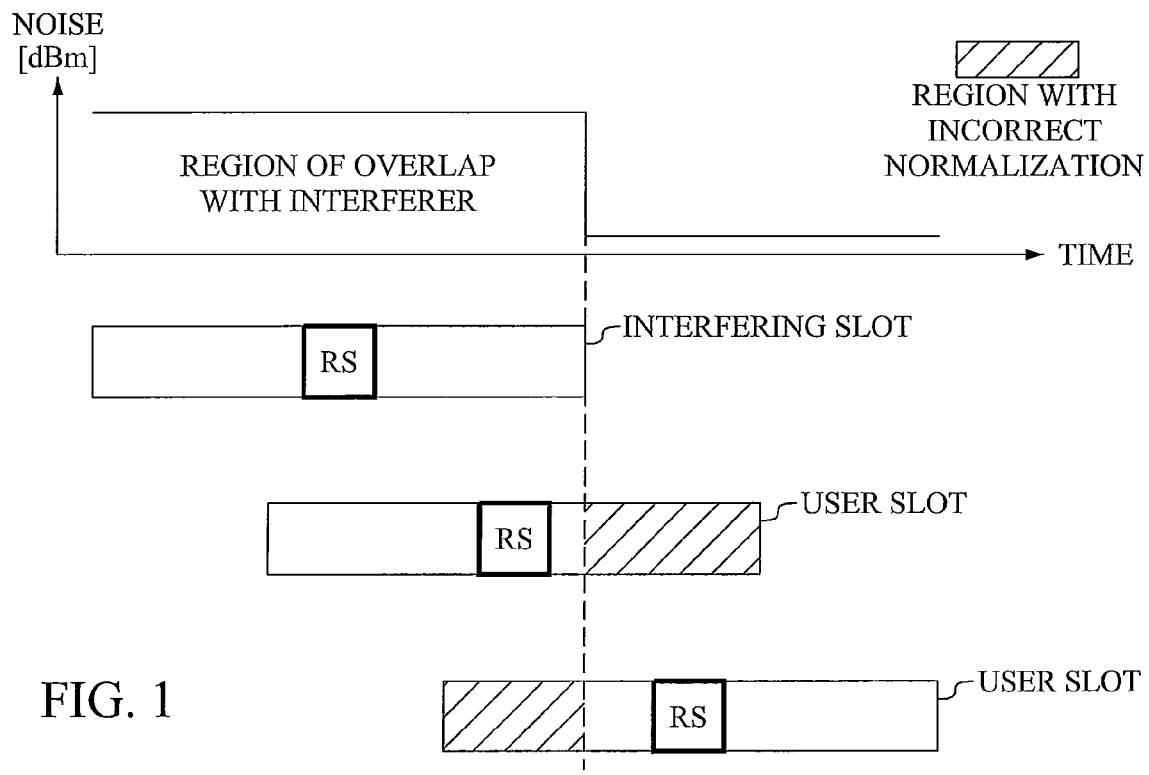
FIG. 1 illustrates situations where unsynchronized networks lead to inconsistent bit soft value normalization.

FIG. 1 illustrates situations where unsynchronized networks lead to inconsistent bit soft value normalization. In an unsynchronized network neighboring cells will not necessarily have the same slot time alignment as the cell containing the signal of interest. In FIG. 1 an interfering slot from a neighboring cell will increase the interference level in the uplink for the duration of the interfering slot. If the RS of a user slot occurs during the time span of the interfering slot, the noise level measured in accordance with the prior art method will be to high during the later (hatched) part of the user slot, where the interferer is no longer active. On the other hand, if the RS of a user slot occurs after the time span of the interfering slot, the noise level measured in accordance with the prior art method will be to low during the first (hatched) part of the user slot, where the interferer is active.

Figure 2:
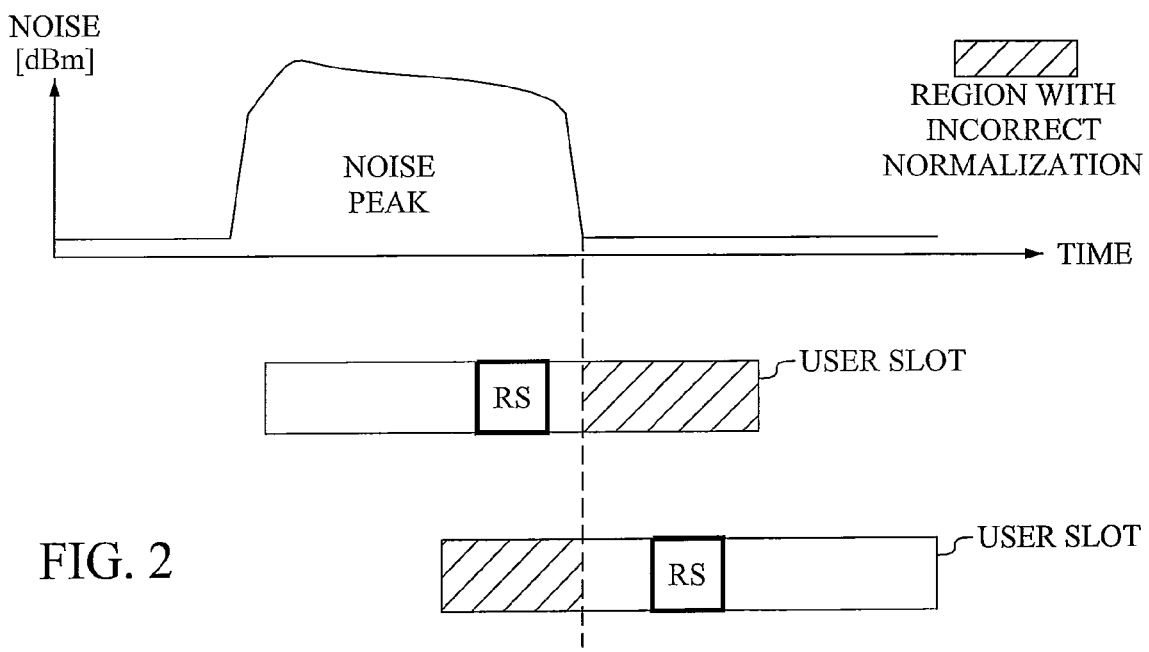
FIG. 2 illustrates situations where a noise peak leads to inconsistent bit soft value normalization.

Similar situations are illustrated in FIG. 2. Here the noise is created by some other type of varying disturbance, such as thermal noise, noise from electronic components, atmospheric noise, etc.

Figure 3:
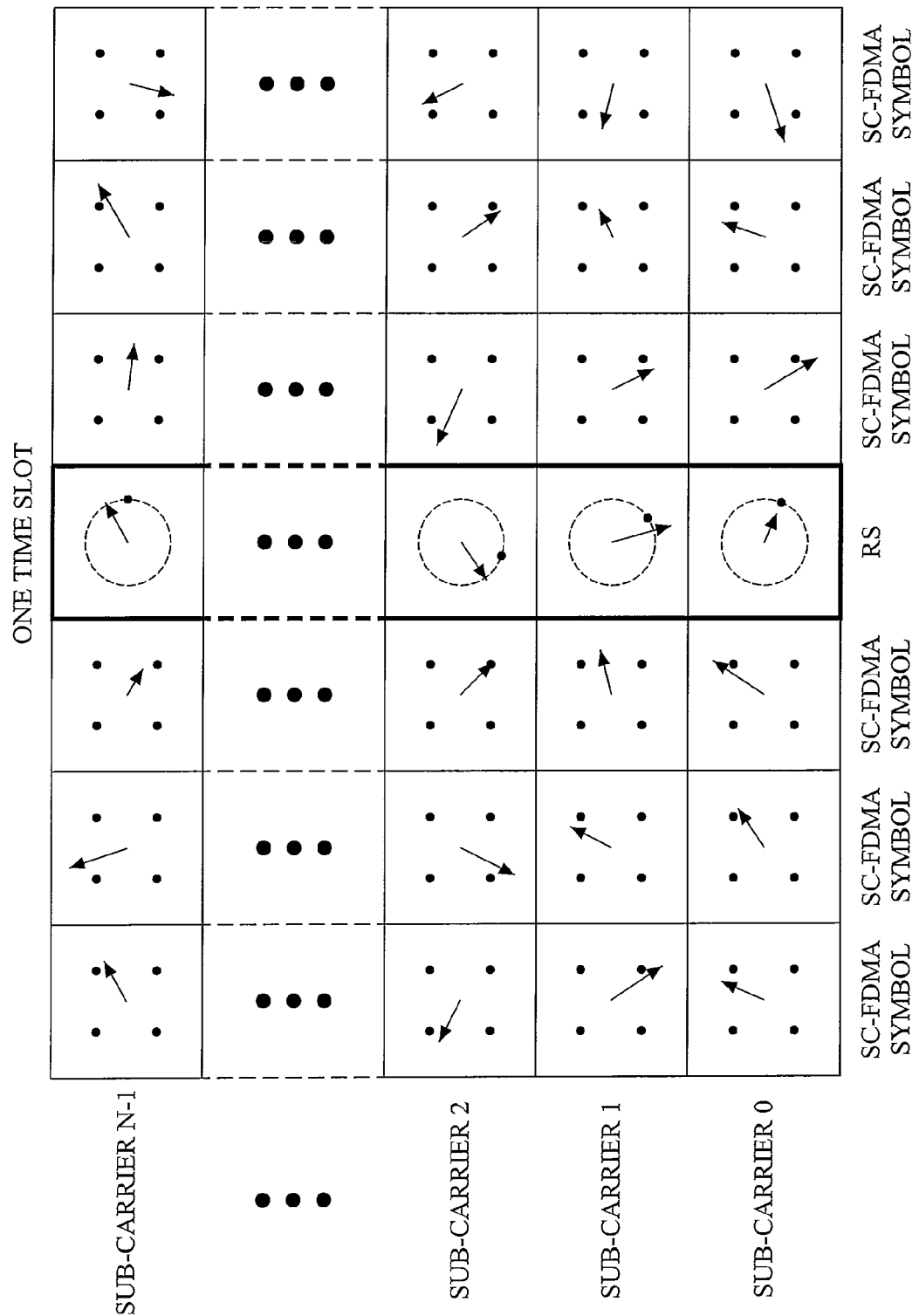
FIG. 3 illustrates an example of the structure of an uplink LTE slot.

FIG. 3 illustrates an example of the structure of an uplink LTE slot. The slot includes 6 SC-FDMA symbols. The middle column is the known RS, which is based on a Zadoff-Chu sequence (the transmitted RS is represented by the points in each square). Each of the 6 SC-FDMA symbols is based on modulated data symbols (complex numbers represented by the arrows) on N sub-carriers. Thus, each SC-FDMA symbol is based on a column of N complex numbers. An SC-FDMA symbol is formed by at least one resource block, which occupies 12 subcarriers. Thus, the number N is a multiple of 12. The value of the complex number representing a transmitted modulated data symbol depends on the used modulation constellation. In FIG. 3 QPSK modulation is assumed. This means that the transmitted data symbol can only be set to one of 4 complex values represented by the dots in FIG. 3. In accordance with the present invention the error between the actually received complex numbers (arrows) and the constellation points will be used to obtain more reliable noise measures.

First the basics behind the noise estimation technique used in the present invention will be explained. The key idea behind this noise estimation technique is to exploit the noise information carried within the SC-FDMA symbols themselves. For this purpose a statistical model which describes the statistical distribution of the received modulated data symbols obtained from the received SC-FDMA symbols is used, as described in more detail in the MATHEMATICAL APPENDIX below.

In the embodiment described here it is assumed that the received modulated data symbols have been equalized and that all echoing copies of the same symbol have been removed. By using this simplification, a PDF of a received modulated data symbol in the presence of AWGN can be described as (see equation (5) in the MATHEMATICAL APPENDIX):

$$f_{r(n)}(z) = \frac{1}{M\pi\sigma^2}\sum_{m=0}^{M-1} e^{-\frac{|z-s_m|^2}{\sigma^2}}$$

where
r(n) is the time discrete-time symbol-spaced baseband model for the received and equalized signal of one sub-carrier,
$s_m$ is the m:th constellation point within a modulation scheme,
M is the total number of constellation points, and
$\sigma^2$ is the noise power.

As an example, for QPSK M=4, and $s_m$ takes the values:

$$s_0 = \frac{1+i}{\sqrt{2}}, s_1 = \frac{1-i}{\sqrt{2}}, s_2 = \frac{-1+i}{\sqrt{2}}, s_3 = \frac{-1-i}{\sqrt{2}}$$

Figure 4:
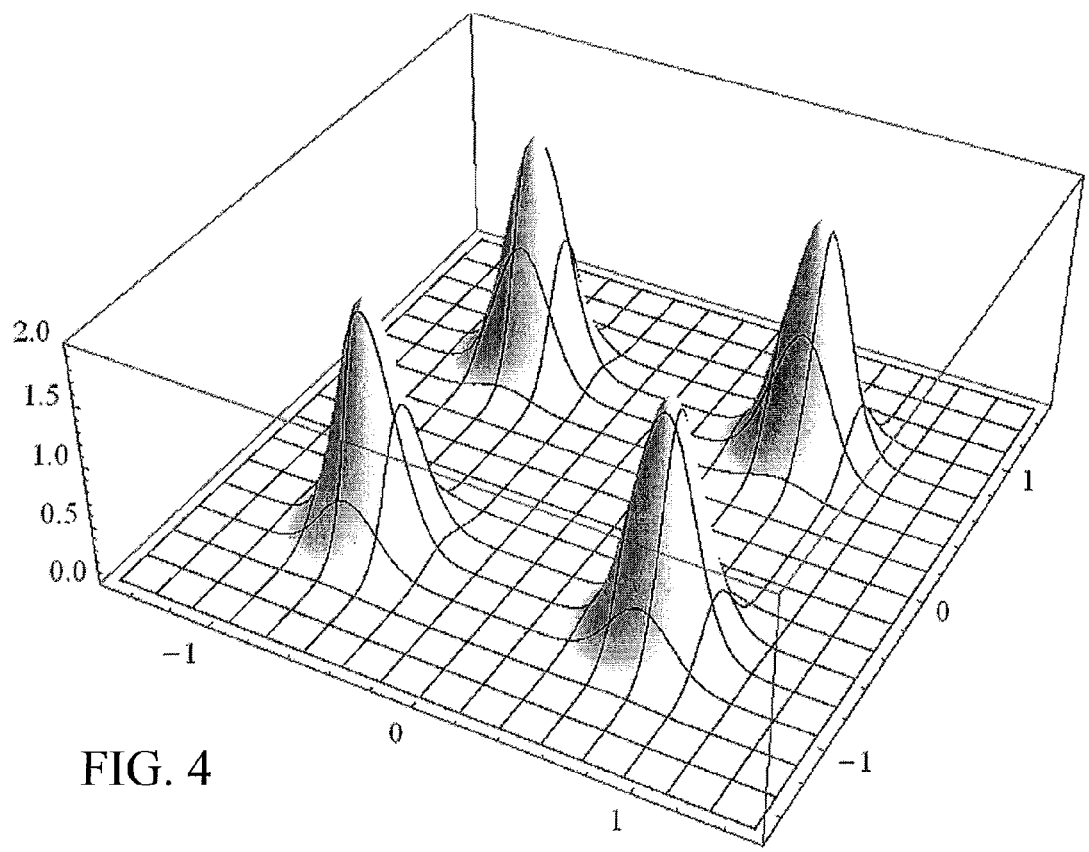
FIG. 4 illustrates the probability density function (PDF) of a received modulated data symbol for a Quadrature Phase Shift Keying (QPSK) constellation plus Additive White Gaussian Noise (AWGN)

The corresponding PDF $f_{r(n)}(z)$ is illustrated in FIG. 4.

The described approach is very general and applicable to most modulation schemes, such as PSK, GMSK, 8PSK, QAM, 16QAM, 64QAM, etc.

As described in the MATHEMATICAL APPENDIX a maximum-likelihood approach can be used to find the noise power $\sigma^2$ (representing the width of the peaks in FIG. 4) in the PDF that gives the best fit to the set of equalized modulated data symbols in one SC-FDMA symbol. The noise power giving the best match between the model and the set of equalized modulated data symbols can be found by solving for the equalized noise measure $\tilde{\sigma}^2$ in the equation (see equation (10) in the MATHEMATICAL APPENDIX):

$$\sum_{n=0}^{N-1}\left\{-1 + \frac{\sum_{m=0}^{M-1} e^{-\frac{|\tilde{r}(n)-s_m|^2}{\tilde{\sigma}^2}} \cdot \frac{|\tilde{r}(n)-s_m|^2}{\tilde{\sigma}^2}}{\sum_{m=0}^{M-1} e^{-\frac{|\tilde{r}(n)-s_m|^2}{\tilde{\sigma}^2}}}\right\} = 0$$

where
$\tilde{r}(n)$ is an equalized received modulated data symbol, and
N is the number of sub-carrier symbols within one SC-FDMA symbol.

This equation can be solved, for example, by the Newton-Raphson method.

Figure 5:
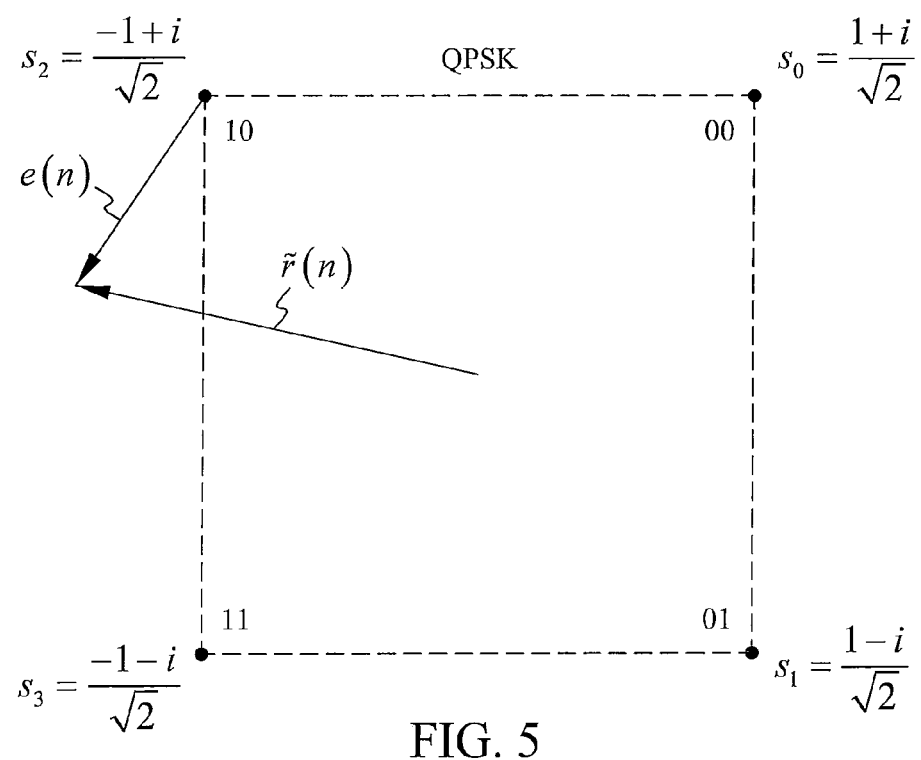
FIG. 5 illustrates the error between a received equalized modulated data symbol and the closest constellation point for QPSK modulation.

However, by considering only the constellation point $s_m$ that is located closest to the equalized modulated data symbol $\tilde{r}(n)$, one obtains (see equation (11) in the MATHEMATICAL APPENDIX):

$$\tilde{\sigma}^2 = \frac{1}{N}\sum_{n=0}^{N-1}|e(n)|^2$$

where e(n) represents the error in the equalized modulated data symbol $\tilde{r}(n)$ as measured to the closest constellation point $s_m$, as illustrated in FIG. 5 for QPSK.

Figure 6:
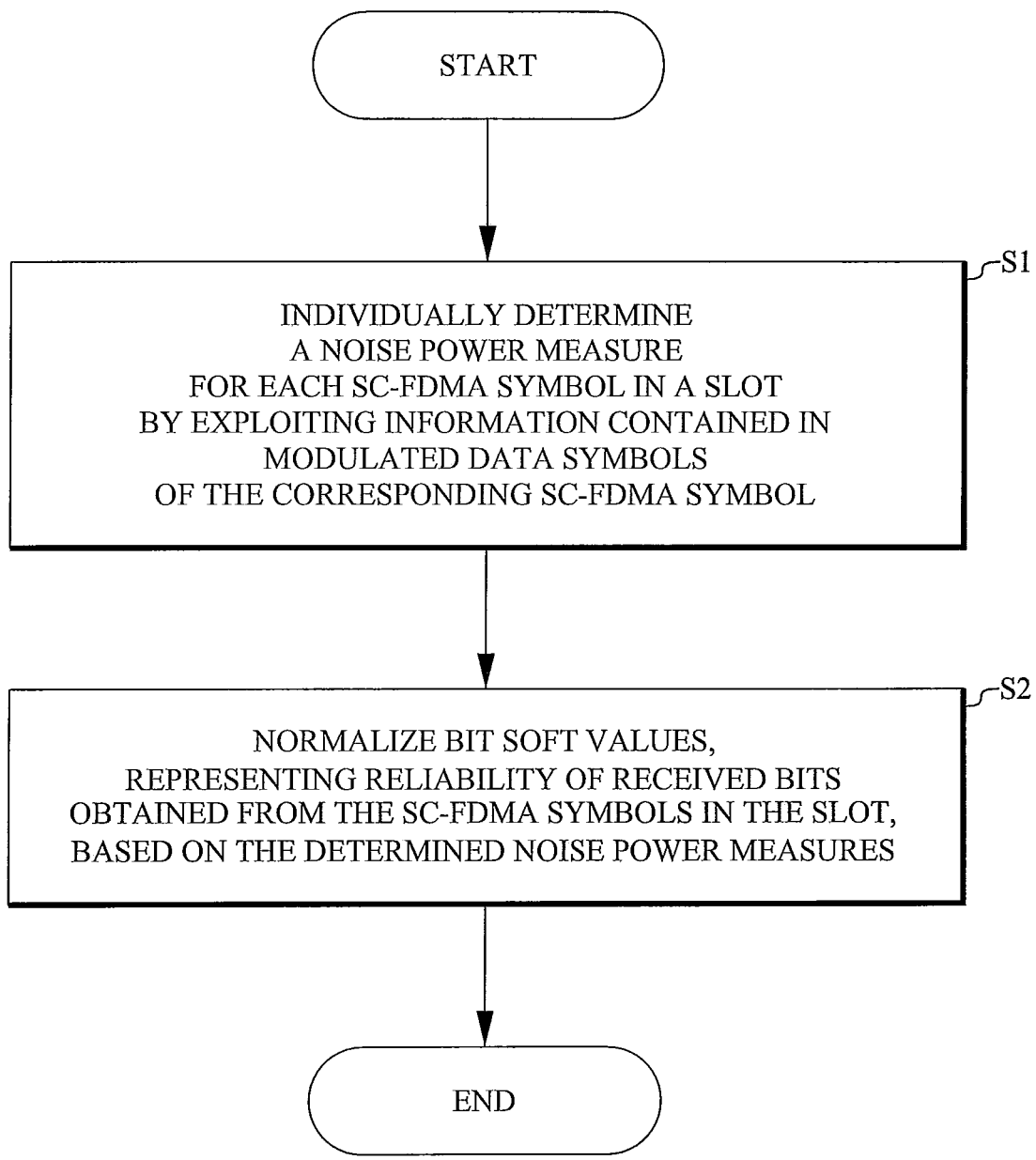
FIG. 6 is a flow chart illustrating the method in accordance with the present invention.

FIG. 6 is a flow chart illustrating the method in accordance with the present invention. Step S1 individually determines a noise power measure for each SC-FDMA symbol in a slot by exploiting information contained in modulated data symbols of the corresponding SC-FDMA symbol. Thereafter step S2 normalizes bit soft values, representing reliability of received bits, obtained from the SC-FDMA symbols in the slot based on the determined noise power measures.

Figure 7:
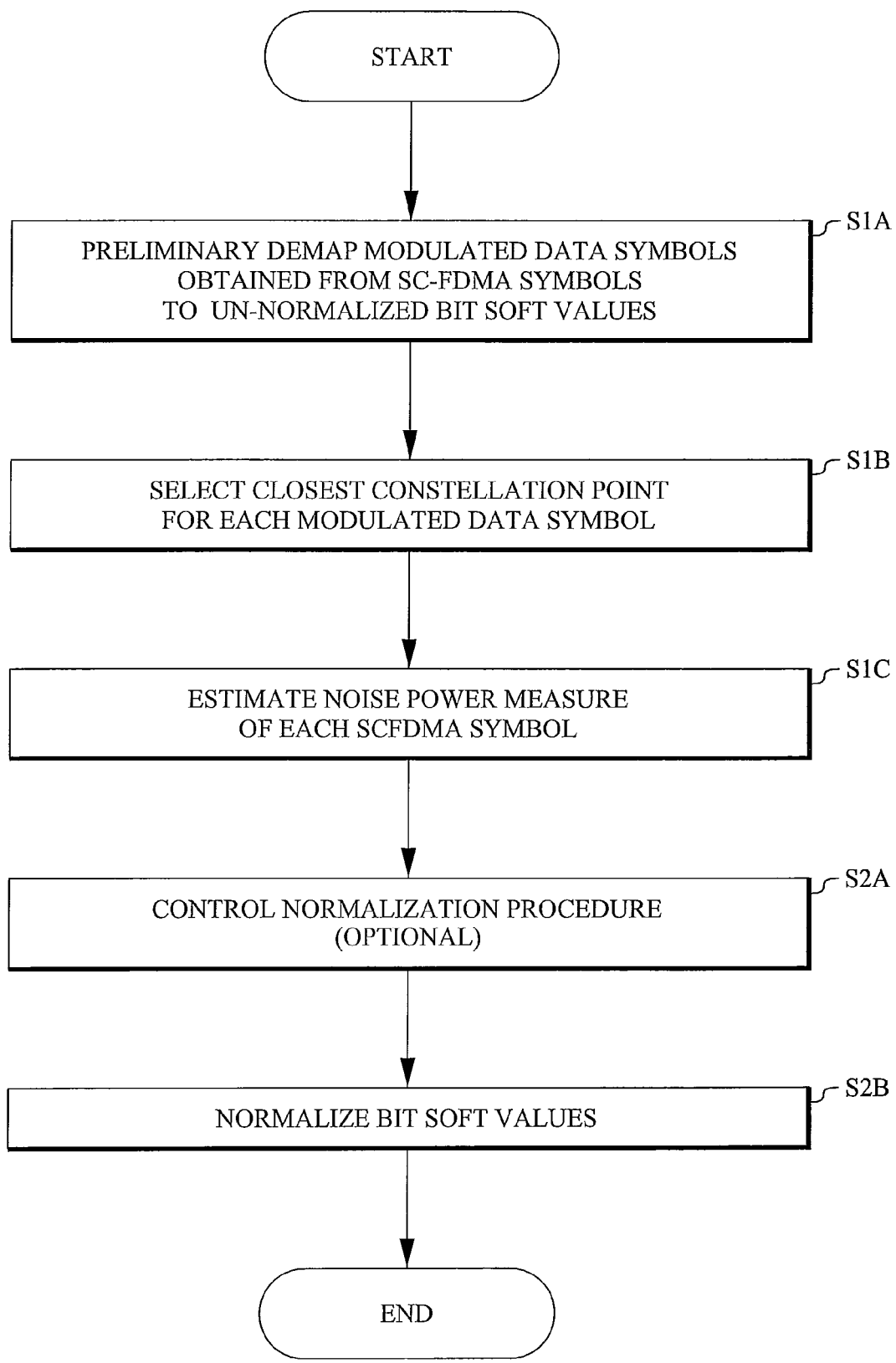
FIG. 7 is a flow chart illustrating an embodiment of the method in accordance with the present invention.

The data aided noise estimation can be combined with a Log-Max based soft demapper. In an embodiment of the present invention illustrated in FIG. 7, the process is split into five steps, namely S1A preliminary demapping, S1B closest constellation point selection, S1C noise power estimation, S2A normalization control (optional) and S2B soft value normalization. These steps will now be described in more detail.

S1A Preliminary demapping

An important property of using a soft demapper utilizing a Log-Max approach is that the noise power can be broken out from the rest of the calculations, i.e. the un-normalized bit soft values uSvi(bi) of modulated data symbols are related to the corresponding normalized bit soft values Svi(bi) by the equation:

$$Svi(bi) = uSvi(bi) \cdot \frac{4}{\tilde{\sigma}^2(d)}$$

where d is an index to the d:th SC-FDMA data symbol within one slot, and bi is an index to the bi:th bit soft value obtained from a SC-FDMA data symbol. The factor 4 is a consequence of the Log-Max procedure.

Since the un-normalized bit soft values uSvi(bi) are independent of the noise power, the demapping from modulated data symbols to bit soft values can be performed without any knowledge about the noise power. The soft demapping is performed on all modulated data symbols obtained from each SC-FDMA symbol. The output of the preliminary demapping step is the unnormalized bit soft values uSvi(bi). The normalization to the corresponding normalized bit soft values Svi(bi) is performed in the final bit soft value normalization step. For this reason this demapping step is considered to be preliminary demapping.

The Log-Max soft preliminary demapping can be performed for any modulation scheme, i.e., GMSK, QPSK, 8PSK, 16QAM, 64QAM etc. The following description of the preliminary demapping procedure will be directed towards QPSK because of its simplicity. The technique is, however, directly applicable to all the other modulation schemes.

Log-Max soft demapping of a data symbol with QPSK modulation is made with the following equation:

$$\begin{cases} uSvi(bi) = \text{real}(v(n)) \\ uSvi(bi+1) = \text{imag}(v(n)) \end{cases}$$

where v(n) is the n:th modulated data symbol obtained from an SC-FDMA symbol. In short, uSvi is a vector including the un-normalized bit soft values that correspond to an SC-FDMA symbol.

S1B Closest Constellation Point Selection

The next step is to select the constellation point that is closest to each modulated data symbol obtained from an SC-FDMA symbol. In this embodiment this is done by applying hard bit decisions on the bit soft values. This reveals the bit-sequence of the constellation point which is closest to the preliminary demapped modulated data symbol. For QPSK modulation the index idx(n) (or state) of the constellation point which has the least distance to the received modulated data symbol can be calculated as:

$$idx(n) = soft2bit(uSvi(bi)) \cdot 2^1 + soft2bit(uSvi(bi+1)) \cdot 2^0$$

where $$soft2bit(x) = \begin{cases} 0, & x \geq 0 \\ 1, & x < 0 \end{cases}$$

convert a bit soft value into a hard bit decision.

EXAMPLE

If the bit soft value outcome of the preliminary demapping of one modulated data symbol is uSvi(bi)=−1.2 and uSvi(bi+1)=0.73, then the corresponding hard bit decisions would be 1 and 0, respectively. For QPSK modulation the resulting bit sequence "10" equals idx(n)=1·$2^1$+0·$2^0$=2, which corresponds to constellation point $$\frac{-1+i}{\sqrt{2}},$$

see FIG. 5.

S1C Noise Power Estimation

The noise power estimate $\tilde{\sigma}^2$(d) over the SC-FDMA data symbol d can now be calculated as:

$$\tilde{\sigma}^2(d) = \frac{1}{N}\sum_{n=0}^{N-1} |v(n) - \Pi(idx(n))|^2$$

where Π is the set of possible constellation points for the used modulation.

For QPSK modulation $$\Pi_{QPSK} = \left\{\frac{1+i}{\sqrt{2}}, \frac{1-i}{\sqrt{2}}, \frac{-1+i}{\sqrt{2}}, \frac{-1-i}{\sqrt{2}}\right\}.$$

S2A Normalization Control (Optional)

One embodiment of the present invention also includes an adaptation procedure that detects if one or several normalization factors shall be used in the user slot. In a sensitivity limited scenario it is preferable to have a common normalization factor on all soft values within the user slot. The reason for this is because the thermal noise power will be evenly distributed within the time span of an user slot and can therefore be represented with just a single value. The common normalization factor is based on the average of determined noise power measures within the user slot. On the other hand, in an interference limited scenario, one or several unsynchronized interferers may appear and disappear during one user slot, making the level of interference jump in time. In such a situation it is less desirable to use a common scaling factor which is valid for the whole user slot. To catch the time varying interference levels within one slot the bit soft values corresponding to each SC-FDMA symbol are normalized with their respective noise power estimates. By using the normalization control procedure describe below it is possible to achieve good link performance in both sensitivity and interference limited scenarios.

An unsynchronized interferer (or short noise peak or dip) can be detected by looking at the quotient between the minimum and the maximum value of $\tilde{\sigma}^2$(d) in one slot. When this quotient is larger than a certain threshold, it is assumed that an unsynchronized interferer (or short noise peak or dip) is present. The detection threshold $\alpha_{Modulation}(N)$ depends on both the modulation scheme and the number N of sub-carriers per SC-FDMA symbol. If the threshold is exceeded, a separate bit soft value normalization factor b(d) is calculated for each SC-FDMA data symbol. Otherwise a common scale factor based on the average of the determined noise power measures is used for all the bit soft values within that slot. The normalization control procedure may be expressed in pseudo-code as:

$$\text{If } \frac{\min_{d\in[0,N_{DS}-1]}(\tilde{\sigma}^2(d))}{\max_{d\in[0,N_{DS}-1]}(\tilde{\sigma}^2(d))} > \alpha_{Modulation}(N)$$

$$\text{then } b(d) = \frac{4}{\tilde{\sigma}^2(d)} \text{ (different for each d)}$$

$$\text{else } b(d) = \frac{4}{\frac{1}{N_{DS}}\sum_{d=0}^{N_{DS}-1}\tilde{\sigma}^2(d)} \text{ (the same for each d)}$$

end where $N_{DS}$ is the number of SC-FDMA symbols in a slot. This normalization control procedure improves the robustness of the normalization.

Here are a few examples:

$$\text{For QPSK } \alpha_{QPSK}(N) = \begin{cases} 0.15 \text{ for 12 subcarriers} \\ 0.25 \text{ for 24 subcarriers} \\ 0.30 \text{ for 36 or more subcarries} \end{cases}$$

$$\text{For 16QAM } \alpha_{16QAM}(N) = \begin{cases} 0.08 \text{ for 12 subcarriers} \\ 0.15 \text{ for 24 subcarriers} \\ 0.20 \text{ for 36 or more subcarriers} \end{cases}$$

$$\text{For 64QAM } \alpha_{64QAM}(N) = \begin{cases} 0.05 \text{ for 12 subcarriers} \\ 0.10 \text{ for 24 subcarriers} \\ 0.15 \text{ for 36 or more subcarriers} \end{cases}$$

S2B Bit Soft Value Normalization

Finally the bit soft values corresponding to each SC-FDMA data symbol are normalized. The normalization factor b(d) corresponding to the SC-FDMA symbol in question is used for this purpose. This post normalization of the un-normalized bit soft values within one SC-FDMA data symbol can be performed by using multiplications. For QPSK the operations will look like this:

$$\begin{cases} Svi(bi) = b(d) \cdot uSvi(bi) \\ Svi(bi+1) = b(d) \cdot uSvi(bi+1) \end{cases}$$

This completes the demapping, and the normalized bit soft values can now be forwarded to the decoder.

In another embodiment the magnitude (or squared magnitude) of the error vector e(n) in FIG. 5 could be used directly to select the closest constellation point. In such an embodiment the normalization (with or without normalization control) would be performed directly on the modulated data symbols.

The normalized modulated data symbols would then be demapped and be ready for decoding.

If the normalization control step is omitted, the bit soft values obtained from each SC-FDMA symbol in the slot may always be normalized with a normalization factor based on the corresponding determined noise power measure.

Another possibility is to always normalize the bit soft values obtained from the SC-FDMA symbols in the slot with a common normalization factor based on the average of determined noise power measures. It has been found that this results in improved decoding, as compared to the prior art RS based normalization, both when the noise is non-stationary and surprisingly also when it is stationary.

Figure 8:
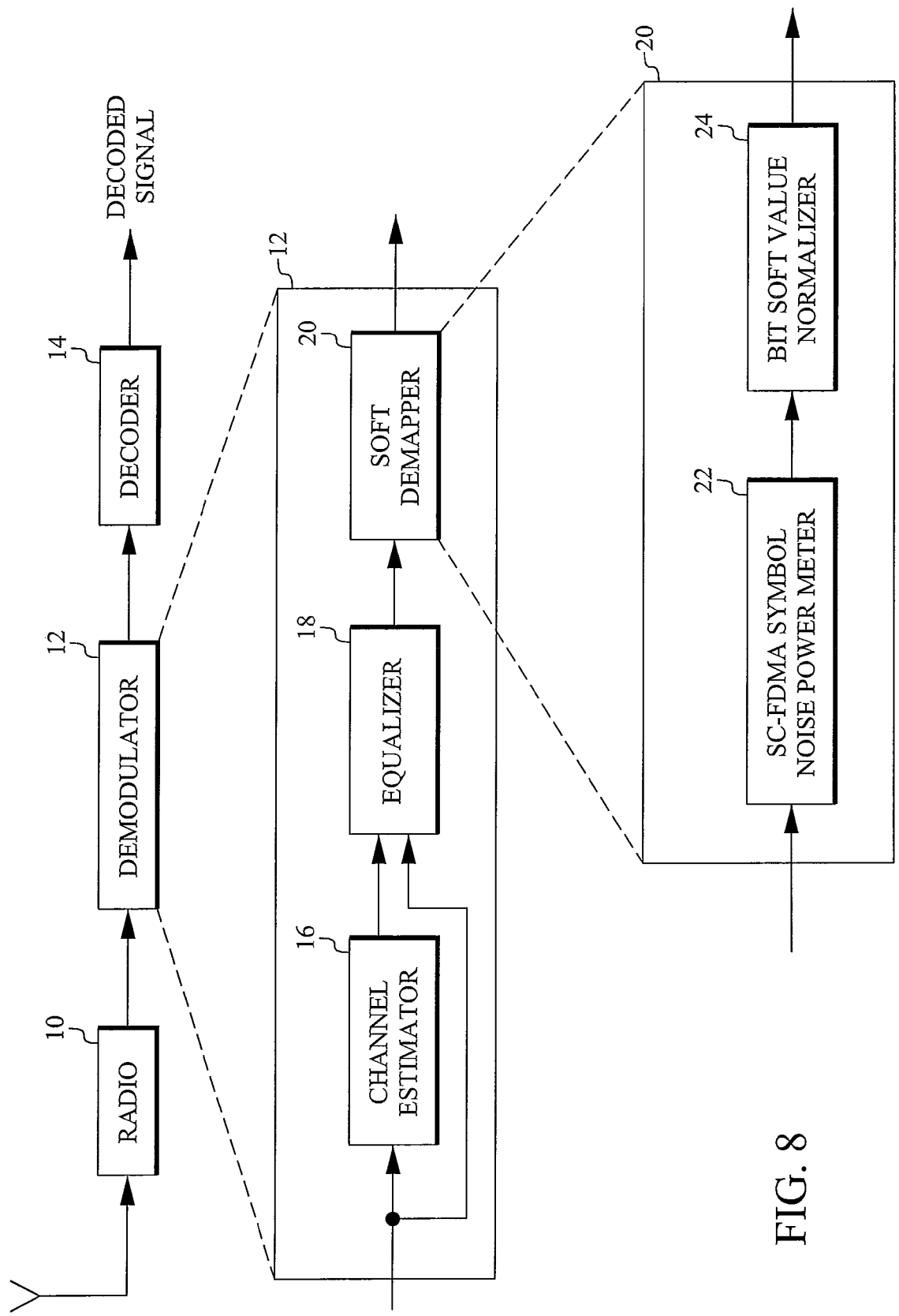
FIG. 8 is a block diagram illustrating an LTE receiver including an LTE uplink soft demapper in accordance with the present invention.

FIG. 8 is a block diagram illustrating an LTE receiver including an LTE uplink soft demapper in accordance with the present invention. An antenna receiving uplink signals is connected to a radio 10 that transforms the signals down to baseband and forwards them to a demodulator 12. Demodulator 12 transforms the received SC-FDMA symbols into modulated data symbols, which are demapped into bit soft values. The transformation involves a DFT (Discrete Fourier Transform) on the received baseband signal followed by an IDFT (Inverse DFT) on the used resource blocks. After demapping demodulator 12 forwards the bit soft values to a decoder 14, which decodes them.

Demodulator 12 includes (the DFT and IDFT are omitted for simplicity) a channel estimator 16 connected to an equalizer 18. The equalized modulated data symbols from equalizer 18 are forwarded to a demapper 20, which demaps them into normalized bit soft values. As noted above, an equalization of the modulated data symbols is not strictly necessary for the present invention, but it is preferable, since it reduces the complexity of the normalization procedure.

Demapper 20 includes the essential elements for performing the bit soft value normalization in accordance with the present invention, namely an SC-FDMA symbol noise power meter 22 and a bit soft value normalizer 24. Meter 22 estimates the noise power of the SC-FDMA symbols in accordance with the principles described above, and normalizer 24 performs the actual normalization.

Figure 9:
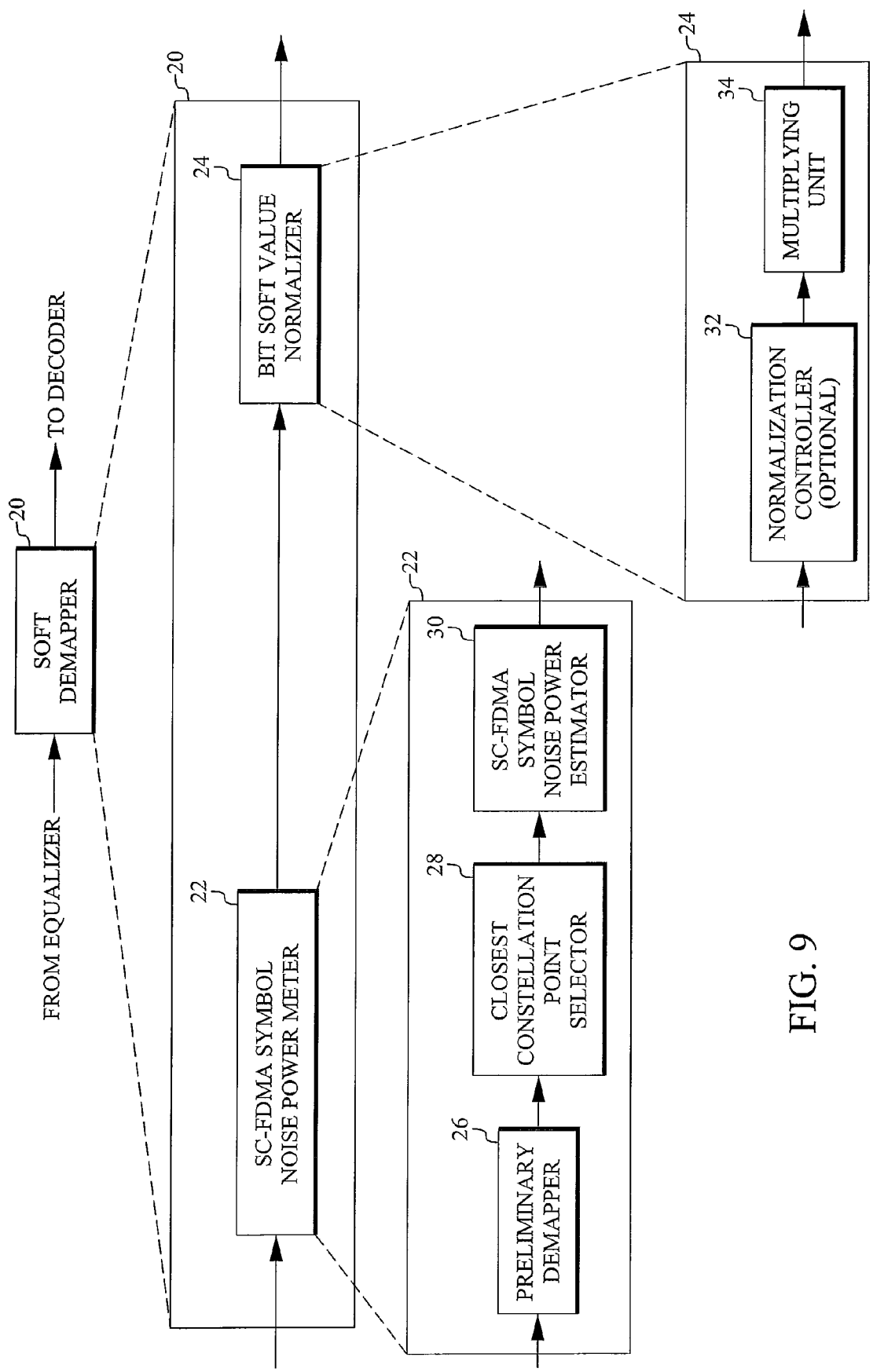
FIG. 9 is a block diagram illustrating an LTE receiver including an embodiment of an LTE uplink soft demapper in accordance with the present invention.

FIG. 9 is a block diagram illustrating an LTE receiver including an embodiment of an LTE uplink soft demapper in accordance with the present invention. In this embodiment SC-FDMA symbol noise power meter 22 includes a preliminary demapper 26, which demaps the modulated data symbols to unnormalized (preliminary) bit soft values. These bit soft values are forwarded to a closest constellation point selector 28, which finds the closest constellation point for each modulated data symbol by applying hard bit decisions on the corresponding un-normalized bit soft values. An SC-FDMA symbol noise power estimator 30 estimates the noise power of each SC-FDMA symbol in accordance with step S1C above.

Bit soft value normalizer 24 in the embodiment of FIG. 9 includes a normalization controller 32 controlling the use of the determined noise power estimates from estimator 30 for bit soft value normalization, as described in step S2A above. This controller is optional and may be omitted if the bit soft values obtained from each SC-FDMA symbol are normalized with a normalization factor based on the corresponding determined noise power measure or if the bit soft values obtained from the SC-FDMA symbols in a slot are normalized with a common normalization factor based on the average of determined noise power measures. The actual normalization is performed by a multiplying unit 34.

The functionality of the various blocks described above is typically based on one or several micro processors or micro/signal processor combinations and corresponding software.

A technique capable of performing bit soft value normalization in the LTE uplink by only exploiting information located in the (preferably equalized) modulated data symbols has been describe above. This makes it possible to calculate an individual bit soft value normalization factor for every SC-FDMA data symbol within one slot. This technique can be put in contrast to a more straight forward method of using an RS based normalization factor shared by all bit soft values within one slot. The main benefits of the new technique are:

1. Increased robustness against unsynchronized interferers. The present invention will make the LTE receiver more robust against interferers coming from neighboring cells that are not synchronized with the serving cell. The benefit of this is that less transmit power is needed in order to reach the same throughput compared to using the conventional method of soft value normalization. Hence, a substantially higher spectral efficiency can be reached in unsynchronized networks.
2. The new technique will to some degree protect against ramping effects which may occur in the power amplifiers of a UE (User Equipment). The ramping can occur when the user bandwidth changes during transmission. The effect of the ramping is that the first and last SC-FDMA symbols in an LTE subframe can have varying amplitude. This variation can be quite large and completely destroy the symbol. The new noise estimation method will interpret this varying amplitude as noise and will automatically scale the bit soft values in a manner so that they are considered as unreliable by the decoder.
3. The invention is computationally efficient and can be integrated into an existing Log-Max symbol to bit soft value demapping procedure by adding a few additional sub-steps.

It will be understood by those skilled in the art that various modifications and changes may be made to the present invention without departure from 3 0 the scope thereof, which is defined by the appended claims.

MATHEMATICAL APPENDIX

An important property of SC-FDMA is that it uses a pre-coder (implemented as a DFT) which has the effect of smearing out the interference from LTE interferers evenly over all sub-carriers. This means that the noise power can be considered to be the same in all modulated data symbols within each SC-FDMA symbol. This property makes it sufficient to make one noise estimation per SC-FDMA symbol.

The basic idea of the noise estimation technique is to use a model of the probability density function that describes the distribution of the received modulated data symbols. Preferably noise estimation is performed on equalized symbols. However, the applicable probability density functions will be derived both before and after equalization.

The modeling of the probability function assumes that a received modulated data symbol contains two parts. The first part is the received constellation symbol of the modulation of interest and the second part is to model the interference as white Gaussian noise. Through this model the probability distribution of a received modulated data symbol is derived. In the actual noise estimation step the maximum-likelihood approach is used to find the noise power that gives the best fit to the set of received modulated data symbols.

Consider a discrete-time symbol-spaced baseband model for the received modulated data symbols r(n) of one sub-carrier, given by:

$$r(n) = \sum_{k=0}^{L-1} h(k)s(n-k) + v(n) \quad (1)$$

where
{s(n)} denotes transmitted symbols,
{h(0)} denotes the channel with L coefficients, and
v(n) denotes white Gaussian noise of variance $\sigma^2$.

Assuming that the data bits are randomly sent as zeros and ones and with equal probability, the probability density function (PDF) of the transmitted symbols s(n) is given by:

$$f_{s(n)}(z) = \frac{1}{M} \sum_{m=0}^{M-1} \delta(z - s_m) \quad (2)$$

where
$s_m$ is the m:th constellation point within a modulation scheme,
M is the total number of constellation points, and
$\delta(x)$ is the Dirac function.

Consider QPSK as an example. In this case M=4, and $s_m$ takes the values:

$$s_0 = \frac{1+i}{\sqrt{2}}, s_1 = \frac{1-i}{\sqrt{2}}, s_2 = \frac{-1+i}{\sqrt{2}}, s_3 = \frac{-1-i}{\sqrt{2}}$$

The probability density function $f_{d(n)}(z)$ of the received modulated data symbols d(n) without the added noise, i.e.

$$d(n) = \sum_{k=0}^{L-1} h(k)s(n-k)$$

is given by:

$$f_{d(n)}(z) = \frac{1}{M^L} \sum_{m=0}^{M^L-1} \delta(z - S_m) \quad (3)$$

where $S_0 = h(0)s_0 + h(1)s_0 + h(2)s_0 + \ldots + h(L-1)s_0,$ $S_1 = h(0)s_1 + h(1)s_0 + h(2)s_0 + \ldots + h(L-1)s_0,$ $S_2 = h(0)s_2 + h(1)s_0 + h(2)s_0 + \ldots + h(L-1)s_0,$

...

...

$S_{M-1} = h(0)s_{M-1} + h(1)s_0 + h(2)s_0 + \ldots + h(L-1)s_0$ $S_M = h(0)s_0 + h(1)s_1 + h(2)s_0 + \ldots + h(L-1)s_0$ $S_{M+1} = h(0)s_1 + h(1)s_1 + h(2)s_0 + \ldots + h(L-1)s_0$ $S_{M+2} = h(0)s_2 + h(1)s_1 + h(2)s_0 + \ldots + h(L-1)s_0$

...

-continued $$S_{2M-1} = h(0)s_{M-1} + h(1)s_1 + h(2)s_0 + \ldots + h(L-1)s_0$$

$$S_{2M} = h(0)s_0 + h(1)s_2 + h(2)s_0 + \ldots + h(L-1)s_0$$

$$S_{2M+1} = h(0)s_1 + h(1)s_2 + h(2)s_0 + \ldots + h(L-1)s_0$$

$$S_{2M+2} = h(0)s_2 + h(1)s_2 + h(2)s_0 + \ldots + h(L-1)s_0$$

...

...

$$S_{3M-1} = h(0)s_{M-1} + h(1)s_2 + h(2)s_0 + \ldots + h(L-1)s_0$$

...
...
...
...
...
...

$$S_{M^L - M} = h(0)s_0 + h(1)s_{M-1} + h(2)s_{M-1} + \ldots + h(L-1)s_{M-1},$$

$$S_{M^L - M+1} = h(0)s_1 + h(1)s_{M-1} + h(2)s_{M-1} + \ldots + h(L-1)s_{M-1},$$

$$S_{M^L - M+2} = h(0)s_2 + h(1)s_{M-1} + h(2)s_{M-1} + \ldots + h(L-1)s_{M-1},$$

...
...

$$S_{M^L - 1} = h(0)s_{M-1} + h(1)s_{M-1} + h(2)s_{M-1} + \ldots + h(L-1)s_{M-1}$$

i.e. $S_m$ is the m:th outcome of all the total outcomes ($M^L$) of the convolution d(n) above.

Since the noise can be assumed to be Gaussian and white, the PDF of v(n) is given by:

$$f_{v(n)}(z) = \frac{1}{\pi\sigma^2} e^{-\frac{|z|^2}{\sigma^2}} \qquad (4)$$

The PDF of a received modulated data symbols r(n) can now be expressed as a convolution between the PDF of the transmitted symbol s(n) and the PDF of the noise v(n), i.e.

$$f_{r(n)}(z) = \int_{-\infty}^{z} f_{s(n)}(u) f_{v(n)}(z-u) du = \frac{1}{M^L \pi \sigma^2} \sum_{m=0}^{M^L - 1} e^{-\frac{|z - S_m|^2}{\sigma^2}} \qquad (5)$$

The log-likelihood function $L(\sigma^2)$ over N modulated data symbols r(n) received in one SC-FDMA symbol, can now be written as:

$$L(\sigma^2) = \ln\left\{\prod_{n=0}^{N-1} f_{r(n)}(r(n))\right\} = \qquad (6)$$

$$\sum_{n=0}^{N-1} \ln\{f_{r(n)}(r(n))\} = \sum_{n=0}^{N-1} \ln\left\{\frac{1}{M^L \pi \sigma^2} \sum_{m=0}^{M^L - 1} e^{-\frac{|r(n) - S_m|^2}{\sigma^2}}\right\}$$

By maximizing $L(\sigma^2)$, i.e. solving the equation $$\frac{d}{d(\sigma^2)}\{L(\sigma^2)\} = 0,$$

a maximum-likelihood estimate of the noise power $\sigma^2$ is obtained. Thus, the equation to be solved is:

$$\frac{d}{d(\sigma^2)}\{L(\sigma^2)\} = \sum_{n=0}^{N-1}\left\{-1 + \frac{\sum_{m=0}^{M^L-1} e^{-\frac{|r(n)-S_m|^2}{\sigma^2}} \cdot \frac{|r(n)-S_m|^2}{\sigma^2}}{\sum_{m=0}^{M^L-1} e^{-\frac{|r(n)-S_m|^2}{\sigma^2}}}\right\} = 0 \qquad (7)$$

Note that equation (7) is defined in terms of the channel distorted symbols $S_m$ rather than the original constellation symbols $s_m$.

Equation (7) is general and is applicable also when no equalization has been performed. However, if an equalization step has been performed prior to the noise estimation step, the Inter Symbol Interference (ISI) of the received symbols can, as an approximation, be assumed to have been completely removed. Equation (1) can then be simplified to a single tap equation:

$$r(n) = h(0)s(n) + v(n) \qquad (8)$$

and equation (7) reduces to:

$$\frac{d}{d(\sigma^2)}\{L(\sigma^2)\} = \sum_{n=0}^{N-1}\left\{-1 + \frac{\sum_{m=0}^{M-1} e^{-\frac{|r(n)-\tilde{s}_m|^2}{\sigma^2}} \cdot \frac{|r(n)-\tilde{s}_m|^2}{\sigma^2}}{\sum_{m=0}^{M-1} e^{-\frac{|r(n)-\tilde{s}_m|^2}{\sigma^2}}}\right\} = 0 \qquad (9)$$

where $\tilde{s}_m$ represents the signal constellation point of the current modulation symbol, multiplied by the single remaining channel tap h(0). Equation (9) may be expressed in terms of the equalized modulated data symbols $$\tilde{r}(n) = h(0)^{-1} r(n) = s(n) + h(0)^{-1} v(n) = s(n) + \tilde{v}(n)$$

This gives:

$$\sum_{n=0}^{N-1}\left\{-1 + \frac{\sum_{m=0}^{M-1} e^{-\frac{|\tilde{r}(n)-s_m|^2}{\tilde{\sigma}^2}} \cdot \frac{|\tilde{r}(n)-s_m|^2}{\tilde{\sigma}^2}}{\sum_{m=0}^{M-1} e^{-\frac{|\tilde{r}(n)-s_m|^2}{\tilde{\sigma}^2}}}\right\} = 0 \qquad (10)$$

where
  $s_m$ are the original constellation points, and
  $\tilde{\sigma}^2$ is the power of the equalized noise $\tilde{v}(n)$.

The solution of equation (10) may be further simplified in a practical implementation. There are many different possibilities to achieve this simplification. One of the simplest implementations is to only consider the constellation point $s_m$ that is located closest to the equalized modulated data symbol $\tilde{r}(n)$. Using such an approach, equation (10) reduces to:

$$\sum_{n=0}^{N-1}\left\{-1+\frac{e^{-\frac{\left|\underset{m}{\operatorname{argmin}}\{\tilde{r}(n)-s_m\}\right|^2}{\tilde{\sigma}^2}} \cdot \frac{\left|\underset{m}{\operatorname{argmin}}\{\tilde{r}(n)-s_m\}\right|^2}{\tilde{\sigma}^2}}{e^{-\frac{\left|\underset{m}{\operatorname{argmin}}\{\tilde{r}(n)-s_m\}\right|^2}{\tilde{\sigma}^2}}}\right\} = 0$$

The exponentials cancel, which leads to:

$$\sum_{n=0}^{N-1}\left\{-1+\frac{\left|\underset{m}{\operatorname{argmin}}\{\tilde{r}(n)-s_m\}\right|^2}{\tilde{\sigma}^2}\right\} = 0$$

or, solving for $\tilde{\sigma}^2$ $$\tilde{\sigma}^2 = \frac{1}{N}\sum_{n=0}^{N-1}\left|\underset{m}{\operatorname{argmin}}\{\tilde{r}(n)-s_m\}\right|^2 = \frac{1}{N}\sum_{n=0}^{N-1}|e(n)|^2 \quad (11)$$

where $e(n) = \underset{m}{\operatorname{argmin}}\{\tilde{r}(n)-s_m\}$ represents the error in the equalized modulated data symbol $\tilde{r}(n)$ as measured to the closest constellation point $s_m$.

In the derivation above it has been assumed that the sent modulated data symbols are scaled to unit length. If this is not the case, the constellation points have to be rescaled accordingly.

REFERENCES

[1] U.S. Pat. No. 7,315,578 (Jung-Fu Cheng).

ABBREVIATIONS

AWGN Additive White Gaussian Noise
DFT Discrete Fourier Transform
IDFT Inverse DFT
ISI Inter Symbol (Sub-carrier) Interference
LTE Long Term Evolution
OFDM Orthogonal Frequency Division Multiplexing
PA Power Amplifier
PDF Probability Density Function
PSK Phase Shift Keying
QAM Quadrature Amplitude Modulation
QPSK Quadrature Phase Shift Keying
RS Reference Signal
SC-FDMA Single Carrier Frequency Division Multiple Access
UE User Equipment
UL UpLink

The invention claimed is:

1. An LTE uplink bit soft value normalization method for Log-Max based de-mapping, including the steps of:
de-mapping modulated data symbols of each corresponding SC-FDMA symbol in a slot to un-normalized bit soft values that are independent of noise power;
individually determining a noise power measure for each said SC-FDMA symbol in the slot by exploiting noise information carried within modulated data symbols of the corresponding SC-FDMA symbol, wherein said exploiting is based on using a statistical model that describes the statistical distribution of received modulated data symbols obtained from received SC-FDMA symbols; and
individually normalizing each of the un-normalized bit soft values, said normalized bit soft values representing reliability of received bits obtained from the SC-FDMA symbols in the slot, based on the determined noise power measures for each corresponding SC-FDMA symbol.

2. The method of claim 1, wherein said normalizing comprises normalizing the bit soft values obtained from each SC-FDMA symbol in the slot with a normalization factor based on the determined noise power measure for that SC-FDMA symbol.

3. The method of claim 1, wherein said normalizing comprises normalizing the bit soft values obtained from the SC-FDMA symbols in the slot with a common normalization factor based on the average of determined noise power measures.

4. The method of claim 1, further comprising controlling said normalization by:
determining a ratio between a smallest determined noise power measure and a largest determined noise power measure;
if the ratio exceeds a predetermined value, normalizing the bit soft values obtained from each SC-FDMA symbol in the slot with a normalization factor based on the corresponding determined noise power measure; and
otherwise, normalizing the bit soft values obtained from the SC-FDMA symbols in the slot with a common normalization factor based on the average of the determined noise power measures.

5. The method of claim 1, further including:
selecting a closest modulation constellation point for each modulated data symbol; and
estimating the noise power measure for each SC-FDMA symbol based on errors between modulated data symbols and corresponding closest modulation constellation points.

6. The method of claim 5, wherein selecting a closest modulation constellation point for each modulated data symbol comprises
finding closest modulation constellation points by hard decoding the un-normalized bit soft values.

7. The method of claim 1, further comprising equalizing the modulated data symbols before determining the noise power measures.

8. A Log-Max based LTE uplink soft demapper, including:
a preliminary demapper configured to demap modulated data symbols of each corresponding SC-FDMA symbol in a slot to un-normalized bit soft values that are independent of noise power;
an SC-FDMA symbol noise power meter configured to individually determine a noise power measure for each said SC-FDMA symbol in the slot by exploiting noise information carried within modulated data symbols of the corresponding SC-FDMA symbol, wherein said exploiting is based on using a statistical model that describes the statistical distribution of received modulated data symbols obtained from received SC-FDMA symbols; and
a bit soft value normalizer connected to the SC-FDMA symbol noise power meter and configured to individually normalize each of the un-normalized bit soft values, representing reliability of received bits obtained from the SC-FDMA symbols in the slot, based on the determined noise power measures for each corresponding SC-FDMA symbol.

9. The demapper of claim 8, wherein the bit soft value normalizer includes a multiplying unit configured to normalize the bit soft values obtained from each SC-FDMA symbol in the slot with a normalization factor based on the corresponding determined noise power measure for that SC-FDMA symbol.

10. The demapper of claim 8, wherein the bit soft value normalizer includes a multiplying unit configured to normalize the bit soft values obtained from the SC-FDMA symbols in the slot with a common normalization factor based on the average of determined noise power measures.

11. The demapper of claim 8, wherein the bit soft value normalizer includes a normalization controller configured to determine a ratio between a smallest determined noise power measure and a largest determined noise power measure, and to control a multiplying unit to:
   normalize the bit soft values obtained from each SC-FDMA symbol in the slot with a normalization factor based on a corresponding determined noise power measure for that SC-FDCMA symbol if the determined ratio exceeds a predetermined value; and
   normalize the bit soft values obtained from the SC-FDMA symbols in the slot with a common normalization factor based on the average of the determined noise power measures otherwise.

12. The demapper of claim 8, wherein the SC-FDMA symbol noise power meter includes:
   a closest modulation constellation point selector configured to find a closest constellation point for each modulated data symbol; and
   an SC-FDMA symbol noise power estimator configured to estimate the noise power measure for each SC-FDMA symbol based on errors between modulated data symbols and corresponding closest modulation constellation points.

13. The demapper of claim 12, wherein the SC-FDMA symbol noise power meter includes:
   a closest constellation point selector connected to the preliminary demapper and configured to find closest modulation constellation points for each modulated data symbol by hard decoding the un-normalized bit soft values.

14. An LTE receiver including the soft demapper of claim 8.

15. The LTE receiver of claim 14, including an equalizer connected to the soft demapper and configured to equalize the modulated data symbols before determining the noise power measures.

* * * * *

UNITED STATES PATENT AND TRADEMARK OFFICE
CERTIFICATE OF CORRECTION

PATENT NO. : 8,867,445 B2  Page 1 of 1
APPLICATION NO. : 13/512357
DATED : October 21, 2014
INVENTOR(S) : Åhlander It is certified that error appears in the above-identified patent and that said Letters Patent is hereby corrected as shown below:

In the specification

In Column 6, Line 48, delete "an user" and insert -- a user --, therefor.

In Column 9, Line 41, delete "from 3 0" and insert -- from --, therefor.

In Column 10, Line 12, delete "{h(0}" and insert -- {h(k)} --, therefor.

In Column 10, Line 13, delete "v(n)" and insert -- {v(n)} --, therefor.

In Column 10, Line 37, delete "$f_{d)n)}(z)$" and insert -- $f_{d(n)}(z)$ --, therefor.

In the claims

In Column 15, Line 19, in Claim 11, delete "SC-FDCMA" and insert -- SC-FDMA --, therefor.

Signed and Sealed this
Twenty-ninth Day of December, 2015

Michelle K. Lee
*Director of the United States Patent and Trademark Office*